(12) United States Patent
DeVorchik et al.

(10) Patent No.: US 6,792,477 B1
(45) Date of Patent: Sep. 14, 2004

(54) DISCOVERING PRINTERS AND SHARES

(75) Inventors: David G. DeVorchik, Seattle, WA (US); Chris J. Guzak, Kirkland, WA (US); Jordan L. K. Schwartz, Seattle, WA (US); Ken Wickes, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/573,307

(22) Filed: May 18, 2000

(51) Int. Cl.[7] .................................................. G06F 3/00
(52) U.S. Cl. ............................. 710/8; 710/17; 710/62; 710/69; 709/104; 709/266
(58) Field of Search .......................... 710/69, 62, 8; 709/266, 17, 104

(56) References Cited

U.S. PATENT DOCUMENTS

| | | | | |
|---|---|---|---|---|
| 5,559,933 A | * | 9/1996 | Boswell .................... | 358/1.15 |
| 5,898,823 A | * | 4/1999 | Sorkin et al. .............. | 358/1.15 |
| 5,905,906 A | * | 5/1999 | Goffinet et al. ............ | 710/8 |
| 6,151,624 A | * | 11/2000 | Teare et al. ............... | 709/217 |
| 6,154,787 A | * | 11/2000 | Urevig et al. .............. | 710/8 |
| 6,256,750 B1 | * | 7/2001 | Takeda ..................... | 714/11 |
| 6,434,630 B1 | * | 8/2002 | Micalizzi et al. ........... | 710/5 |
| 6,457,053 B1 | * | 9/2002 | Satagopan et al. .......... | 709/226 |
| 6,467,090 B1 | * | 10/2002 | Brodigan ................... | 725/87 |
| 6,507,869 B1 | * | 1/2003 | Franke et al. .............. | 709/224 |

* cited by examiner

*Primary Examiner*—Jeffrey Gaffin
*Assistant Examiner*—Niketa Patel
(74) *Attorney, Agent, or Firm*—Banner & Witcoff, Ltd.

(57) ABSTRACT

The present invention discloses methods and systems for discovering printers and shares on a computer network. Each domain on the network is identified, and each computer in the domain is identified. In addition, each printer connected to the computer and each share on the computer is identified. Shortcuts to the identified printers and shares are created on at least one computer on the network. Moreover, drivers are preferably installed on the computer for each printer for which a shortcut was created. In the event that the total number of resources (i.e., shares and/or printers) exceeds a threshold, then the process terminates. Otherwise, the present invention continues until all printers and shares on the network are identified, and the appropriate shortcuts are created. Thus, the present invention provides methods and systems for discovering resources on a network.

11 Claims, 3 Drawing Sheets

DISCOVERING PRINTERS AND SHARES

FIELD OF THE INVENTION

This invention relates to locating resources on a computer-network. In particular, this invention pertains to a method and system for automatically discovering printers and shares on a computer network.

BACKGROUND OF THE INVENTION

The prevalence of computer networks is increasing. In fact, more and more computer users are installing networks at home. One of the primary advantages of a home computer network is the ability to share information and resources.

Unfortunately, prior-art computer-networking software does not allow users to automatically locate printers and shares (i.e. file folders that are accessible by a plurality of users) on the network. Instead, if a person is using a first computer and decides that he or she would like to utilize a resource (i.e., printer or share) on another computer, the person must know the exact computer path (e.g., \\servername\sharedfolder and then can optionally have \subdir\subdir\file) to the resource. Of course, this is cumbersome for experienced computer users. And, this problem is practically insurmountable for novice users.

Accordingly, it is an object of the present invention to provide methods and systems for automatic discovery of printers and shares on a computer network.

SUMMARY OF THE INVENTION

The present invention can be broadly summarized as follows. Each domain on a computer network is identified, and each computer within each domain is also identified. In addition, each printer connected to each computer is identified. Further, each share on each computer is identified. Thus, the printers coupled to and shares on the networked computers are identified.

The present invention may also create shortcuts to one or more of the identified shares and printers. Furthermore, drivers may also be automatically or manually installed for printers for which shortcuts were created.

Of course, the methods and computer-executable instructions of this embodiment may also include other additional components and/or steps.

Other embodiments are disclosed and claimed herein as well.

BRIEF DESCRIPTION OF THE DRAWINGS

The present invention may take physical form in certain parts and steps, embodiments of which will be described in detail in this specification and illustrated in the accompanying drawings which form a part hereof, wherein.

DETAILED DESCRIPTION OF THE INVENTION

The present invention provides methods and systems for automatically discovering printers and shares on a computer network. In particular, this invention overcomes the problems of the prior art by preferably identifying all domains and computers located therein. Each share on a computer and each printer connected to a computer is also identified. By identifying the shares and printers, applicable shortcuts to the shares and printers can be created. And, if desired, drivers for the printers can be manually or automatically installed for the identified printers. Thus, this invention provides for automatic discovery of printers and shares.

Figure 1:
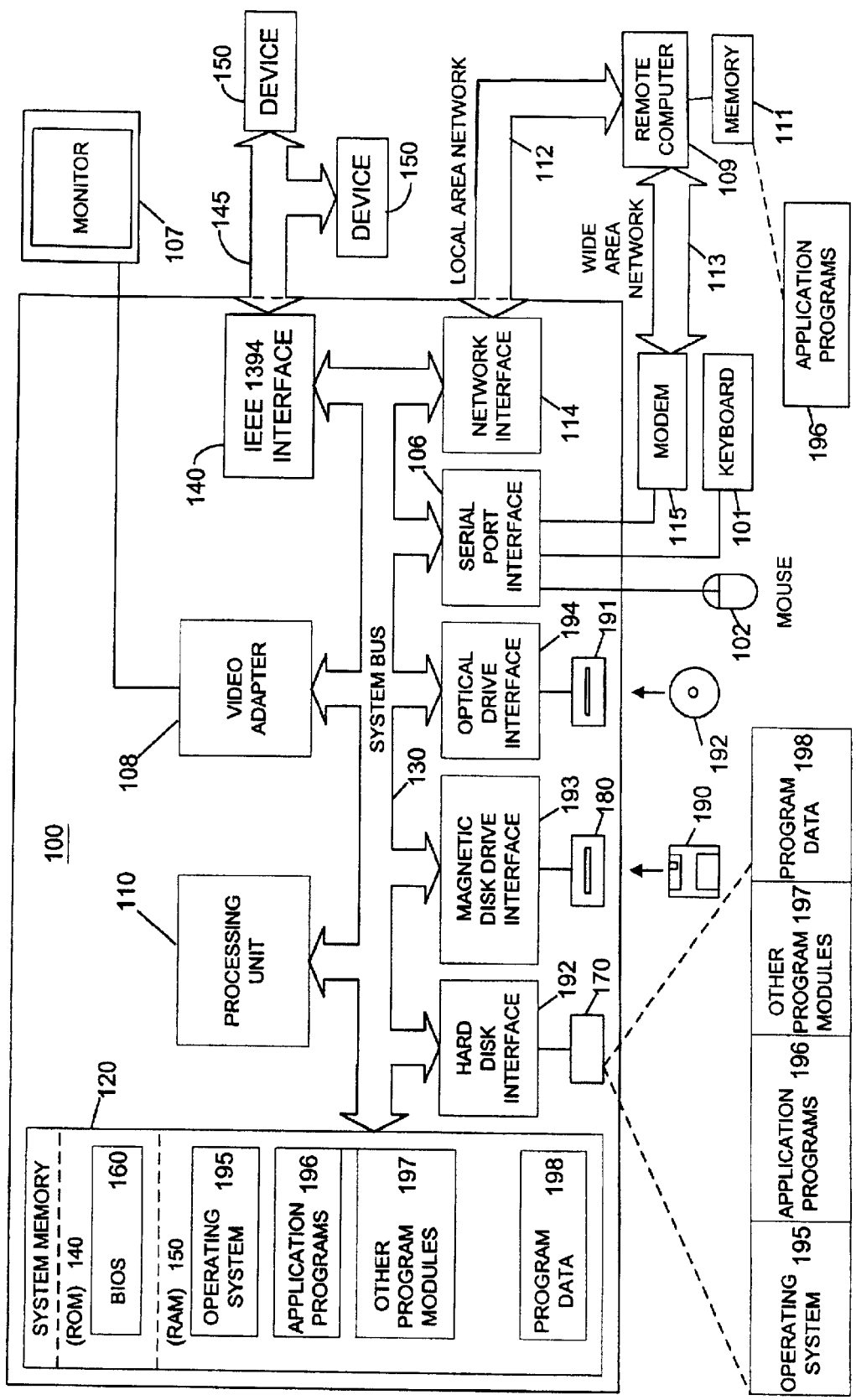
FIG. 1 is a schematic block diagram of a conventional general-purpose digital computing environment that can be used to implement various aspects of the present invention.

FIG. 1 is a schematic diagram of a conventional general-purpose digital-computing environment that can be used to implement various aspects of the present invention. A computer 100 includes a processing unit 110, a system memory 120 and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for the computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. In particular, the RAM 150 will, from time to time, store various device drivers, as known in the art. A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may include a microphone, joystick, game pad, satellite dish, scanner, or the like. These and other input devices are often connected to the processing unit 110 through a serial k& port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

An IEEE 1394 (i.e. FireWire) interface 140 may also be provided. The FireWire interface 140 couples a FireWire-compliant serial bus 145 to the system bus 130 or similar communication bus. The FireWire-compliant serial bus 145, as known in the art, allows multiple devices 150 to communicate with the computer 100 and each other using high-speed serial channels. The FireWire-compliant serial bus 145 may also be used as the computer network 112, 113 itself. The FireWire serial bus standard is based largely upon the internationally adopted ISO/IEC 13213 (ANSI/IEEE 1212) CSR Architecture Specification and the IEEE 1394-1995 Serial Bus Specification, the teachings of which are herein incorporated by reference. Additional buses such as the PCI bus can be provided in computer 100 and interfaced to the FireWire and other buses.

A typical serial bus having a FireWire standard architecture is comprised of a multiplicity of nodes that are interconnected via point-to-point links, such as cables, that each connect a single node of the serial bus to another node of the serial bus. The nodes themselves are addressable entities that can be independently reset and identified. Nodes are logical entities, each with a unique address. Each node provides a so-called configuration ROM (read-only memory)-hereinafter referred to as configuration memory—and a standardized set of control registers that can be accessed by software residing within the computer system.

The computer 100 can operate in a networked environment using logical connections to one or more remote computers, such as a remote computer 109. The remote computer 109 typically includes at least some of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to local network 112 through a network interface or adapter 114. When used in a WAN networking environment the computer 100 and remote computer 109 may both include a modem 115 or other means for establishing a communications over wide area network 113, such as the Internet. The modem 115, which may be internal or external, is connected to system bus 130 via the serial port interface 106. In a networked environment program modules depicted relative to the computer 100, or portions thereof, may be stored in the remote memory storage device.

It will be appreciated that the network connections shown are exemplary and other means of establishing a communications link between the computers can be used. The existence of any of various well-known protocols, such as TCP/IP, "ETHERNET", FTP, HTTP and the like, is presumed, and the system can be operated in a client-server configuration to permit a user to retrieve web pages from a web-based server. Procedures of the present invention to be described below can operate within the environment of the computer 100 shown in FIG. 1.

Figure 2:
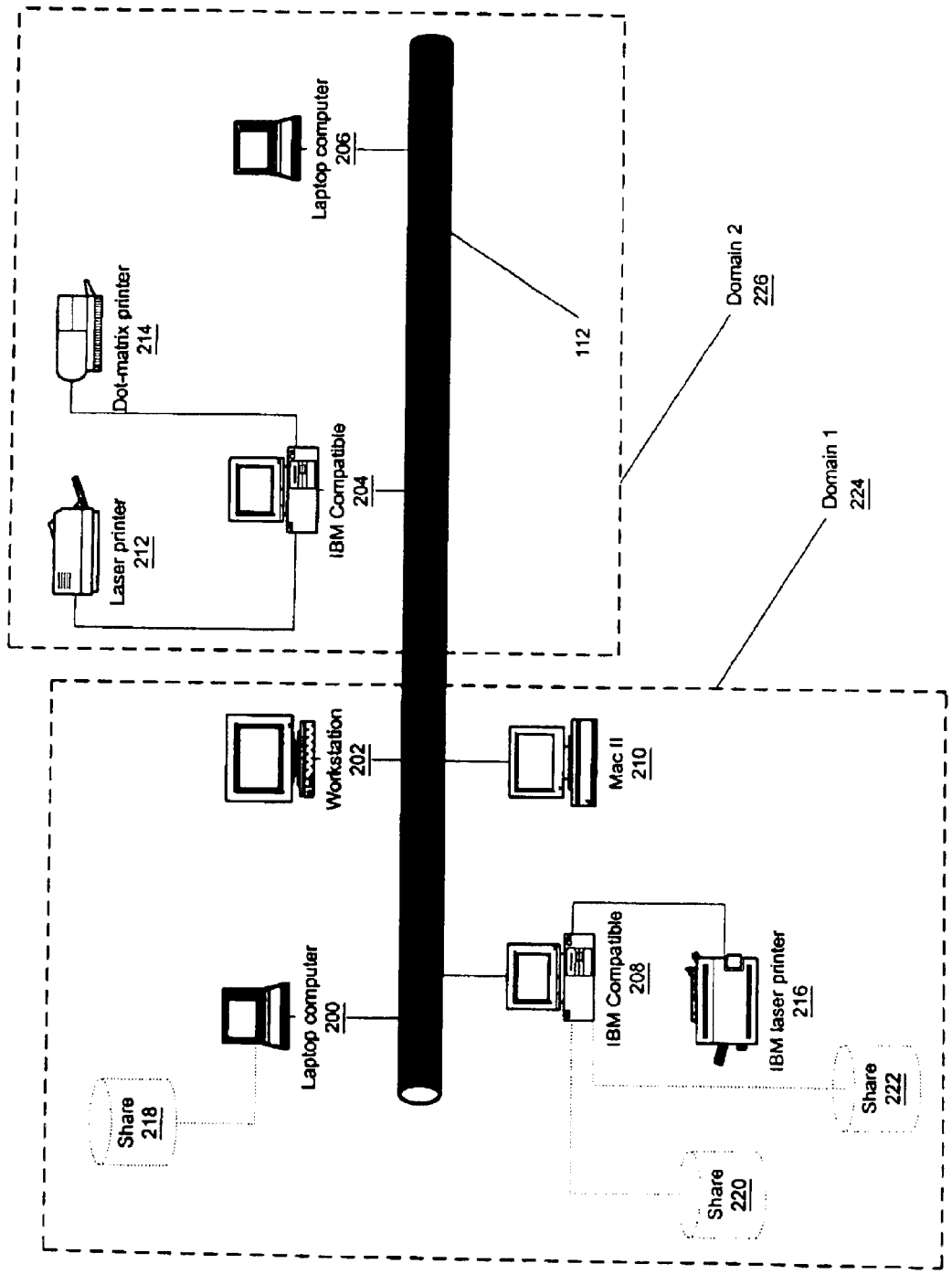
FIG. 2 is a schematic block diagram of an illustrative networking environment wherein printers are connected to various computers within the same and different domains, and wherein shares are located on some of the computers.

FIG. 2 is a schematic block diagram of an illustrative networking environment that could be used wherein the present invention could be implemented. As shown, a network, such as an Ethernet network, connects any number of computers 200–210. The computers 200–210 could be any type of general-purpose computer 100 including but not limited to a laptop computer 200, 206, a workstation 202, an IBM compatible computer 204, 208, or a Macintosh computer 210. Moreover, any number and any type of printers can be connected to one or more computers. Similarly, any number of shares can be located on one or computers. And, of course, the computers can be located in one or more domains 224, 226.

During operation, the present invention is preferably operating on one or more computers. For example, the invention might be implemented as part of a computer operating system running on laptop computer 206. Once activated or enabled, invention would then proceed to crawl the network. In other words, the invention would identify a first domain to search. This domain 224, 226 could be the domain 226 in which the laptop computer 206 resides or any other domain 224 on the network 112.

Next, the invention should identify one or more of the computers in the selected domain. For example, if the selected domain were the domain 226 in which the laptop computer 206 was located, the invention would identify the IBM compatible computer 204. The applicable resources connected to the computer 204 would then be identified. In this case, the laser printer 212 and the dot-matrix printer 214 would be identified. Pointers to these resources can then be created on the laptop computer 206 for easy access to the resource.

If desired, drivers for the printers can also be either manually or automatically loaded. If manually loaded, the present invention would prompt the user to insert the computer-readable media containing the applicable driver or ask the user to identify the location on the computer or on the network containing the driver. If automatically loaded, the present invention could load the driver from a local computer-readable medium, a network location, or from the resource itself if the driver was stored thereon as is the case with some FireWire devices.

With respect to the pointers created on the laptop computer 206, these pointers are preferable Windows® "shortcuts." Of course, a shortcut is a special type of file in Windows® 95, Windows® 98, Windows® 2000, and Windows® Millennium that points to another file, device, or resource. Users can place shortcuts on the desktop to conveniently access files, devices, and resources that may be stored deep in the local or network directory structure. Double-clicking the shortcut icon is the same as double-clicking the actual file, device, or resource.

After all computers and resources in one domain 226 are identified, the invention preferably proceeds to perform the same task with the next domain 224 until all resources 218, 220, 222, 216 in this domain 224 are identified. The present invention would preferably continue until all resources in all domains were identified.

However, in some embodiments, the invention may utilize a threshold value. So, for example, if a certain number of printers and/or shares are identified (e.g., 10), then the invention might stop identifying other resources. This would prevent shortcuts to too many resources being created on a desktop. Also, in order to obviate this problem or to use the invention in large network environments, the invention could be configured to identify resources in only certain domains or workgroups.

It should be noted that one of the significant advantages of the present invention is that the invention need not be implemented on every computer on the network in order to operate. Consequently, if the present invention was only installed on one computer and all other computers were executing legacy software, the invention would still operate properly. This is because the present invention crawls (i.e. queries) computers 200–210 on the network 112 itself, instead of simply a) broadcasting a message and waiting for responses from the networked computers.

Figure 3:
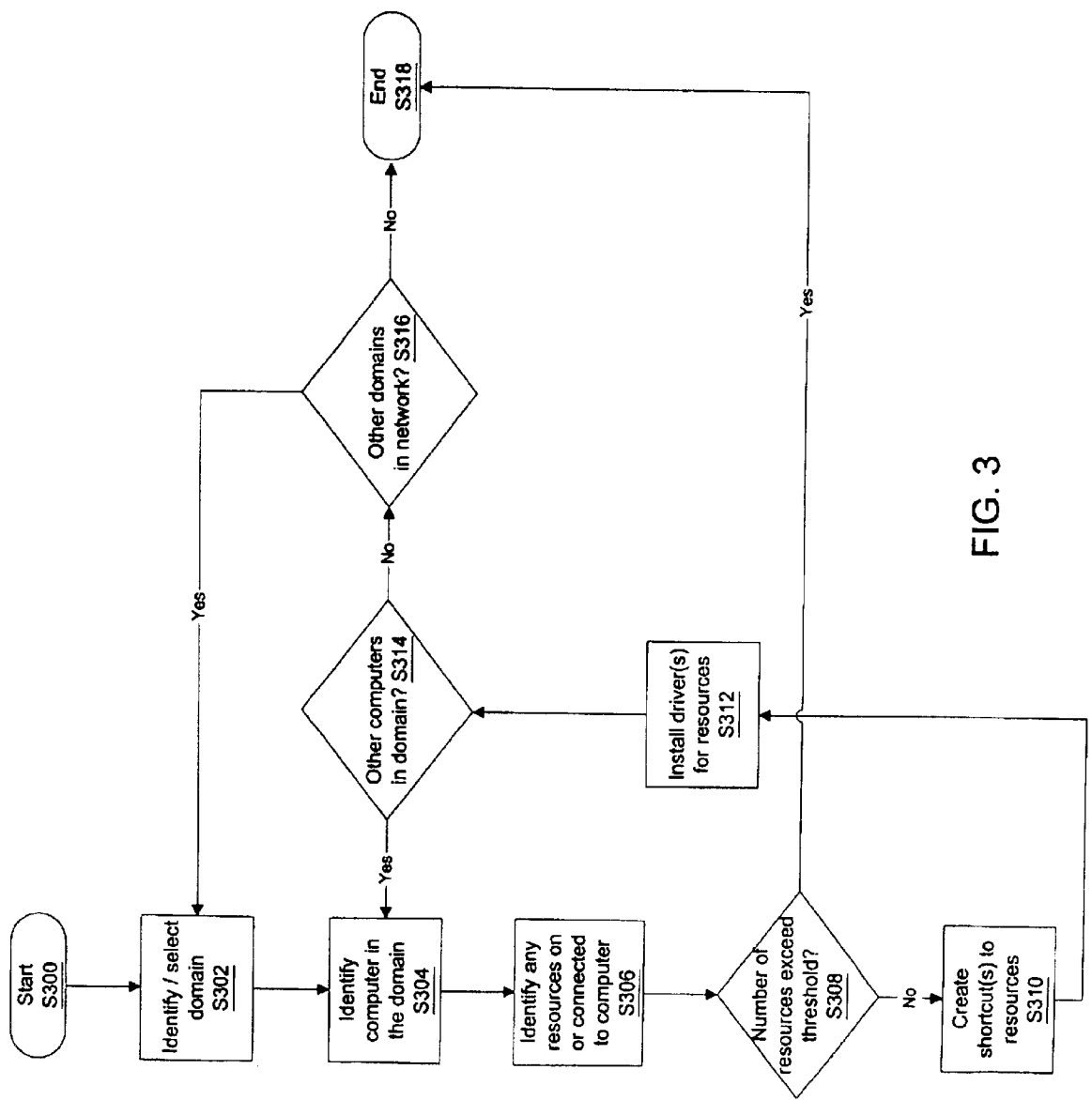
FIG. 3 is a flow chart that illustrates the method(s) of implementing various aspects of the present invention.

A flow chart illustrating the general method(s) of implementing the present invention is depicted in FIG. 3. The invention is first enabled or started S300. Users can select the domain 224, 226 in which resources are to be identified, or the present invention can crawl the entire network by identifying a domain S302. A first computer 200–210 is identified S304 in a domain 224, 226. Resources such as printers connected to the computer or shares 212, 214, 216, 218, 220, 222 on the computer are also identified.

The present invention preferably keeps a running count of the number of resources identified. This is to ensure that excessive shortcuts or pointers to the resources are not created on the computer using the present invention. The running count is compared against the threshold of (i) printers, (ii) resources, or (iii) printers and resources S308. This threshold can be automatically set by the invention and/or manually configured by the user. In any event, if the number of resources exceeds this threshold, the present invention preferably stops generating shortcuts and might delete any previously created shortcuts S318.

If the number of resources does not exceed the threshold S308, then the invention can create the appropriate shortcuts on the computer S310. In some embodiments, the present invention might keep track of shortcuts that were previously deleted by the user. In these embodiments, the invention might not create shortcuts for these previously deleted resources due to the fact that the user previously indicated that he or she did not want these links.

The present invention can install driver(s) for the resources for which it created shortcuts S312. As previously noted, the invention can prompt the user to manually install the driver(s) for the new resource, or the invention can automatically install the driver(s) from some local or remote source.

After the drivers are installed, then the invention would check to see if there are other computers in the domain S314. If so, then steps S304 through S314 would be repeated. If there are no other computers in the domain S314, then the invention would check to see if there are any other domains in the network that are to be searched S316. If other domains are to be queried, then steps S302–S316 would be repeated. If not, then the process would be terminated S318.

Of course, various embodiments of the present invention might run the inventive program at different intervals. For example, the invention could be automatically run at periodic intervals, or could be manually initiated.

Furthermore, shortcuts to the resources on a computer running the present invention could be deleted if the resources have not been accessed in a certain period of time. This would make sure that only resources that are frequently accessed have shortcuts on the desktop of the computer.

In sum, the present invention overcomes the limitations and problems of the prior art by providing an automated solution for discovering printers and shares. In particular, this invention overcomes the problems of the prior art by preferably identifying all domains and computers located therein. Each share on a computer and each printer connected to a computer is also identified. By identifying the shares and printers, applicable shortcuts to the shares and printers can be created. And, if desired, drivers for the printers can be manually or automatically installed for the identified printers. Thus, this invention provides methods and systems for automatic discovery of printers and shares on a computer network, and allows users to easily utilize resources connected to or stored on other computers.

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. For example, instead of being implemented in conjunction with a standard Ethernet architecture, the present invention could be implemented on any serial bus or other communication medium. Furthermore, the order in which the inventive steps are performed and/or the precise steps involved can be varied. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

What is claimed is:

1. A method of discovering resources on a computer network comprising the steps of:
   (a) identifying at least one first domain in the computer network;
   (b) identifying at least one computer in the domain; and
   (c) identifying, by a user's computer, at least one printer connected to the computer, and a path to one of the at least one printer, wherein each said printer connected to the computer is identified, and wherein each said printer connected to the computer is identified until the total number of said identified printers connected to the computer equals a printer threshold and, after the printer threshold is reached, the step of identifying the printers is terminated.

2. A method of discovering resources on a computer network comprising the steps of:
   (a) identifying at least one first domain in the computer network;
   (b) identifying at least one computer in the domain;
   (c) identifying, by a user's computer, at least one printer connected to the computer, and a path to one of the at least one printer, wherein each said printer connected to the computer is identified until the total number of said identified printers connected to the computer equals a printer threshold and, after the printer threshold is reached, the step of identifying the printers is terminated; and
   (d) identifying at least one share on the computer, wherein each said printer connected to the computer and each said share on the computer is identified.

3. A method of discovering resources on a computer network comprising the steps of:
   (a) identifying at least one first domain in the computer network;
   (b) identifying at least one computer in the domain;
   (c) identifying, by a user's computer, at least one printer connected to the computer, and a path to one of the at least one printer; and
   (d) identifying at least one share on the computer, wherein each said printer connected to the computer and each said share on the computer is identified, and wherein each said share on the computer is identified until the total number of said identified shares on the computer equals a share threshold and, after the share threshold is reached, the step of identifying the shares is terminated.

4. A method of discovering resources on a computer network comprising the steps of:

(a) identifying at least one first domain in the computer network;

(b) identifying at least one computer in the domain;

(c) identifying, by a user's computer, at least one printer connected to the computer, and a path to one of the at least one printer; and (d) identifying at least one share on the computer, wherein each said printer connected to the computer and each said share on the computer is identified, and wherein each said share and said printer is identified until the total number of said identified shares and said identified printers equals a resource threshold and, after the resource threshold is reached, the steps of identifying the shares and the printers are terminated.

5. The method of claim 4 wherein the resource threshold is 10.

6. A method of discovering resources on a computer network comprising the steps of:

(a) identifying at least one first domain in the computer network;

(b) identifying at least one computer in the domain;

(c) identifying, by a user's computer, at least one printer connected to the computer, and a path to one of the at least one printer;

(d) identifying at least one share on the computer, wherein each said printer connected to the computer and each said share on the computer is identified;

(e) creating at least one shortcut to each said printer that was identified; and (f) creating at least one shortcut to each said share that was identified.

7. A method of discovering resources on a computer network comprising the steps of:

(a) identifying at least one first domain in the computer network;

(b) identifying at least one computer in the domain;

(c) identifying, by a user's computer, at least one printer connected to the computer, and a path to one of the at least one printer;

(d) identifying at least one share on the computer, wherein each said printer connected to the computer and each said share on the computer is identified;

(e) identifying at least one other domain on the network after all said printers and shares in the first domain are identified;

(f) identifying at least one other computer in the other domain;

(g) identifying at least one other printer connected to the other computer;

(h) identifying at least one other share on the other computer;

(i) creating at least one shortcut to each said printer and each said other printer that was identified; and (j) creating at least one shortcut to each said share and each said other share that was identified.

8. A method of discovering resources on a computer network comprising the steps of:

(a) identifying at least one domain in the computer network;

(b) identifying at least one computer in the domain; and (c) identifying, by a user's computer, at least one share on the computer, and a path to one of the at least one share, wherein each said share on the computer is identified until the total number of said identified shares on the computer equals a share threshold and, after the share threshold is reached, the step of identifying the shares is terminated.

9. A method of discovering resources on a computer network comprising the steps of:

(a) identifying at least one domain in the computer network;

(b) identifying at least one computer in the domain;

(c) identifying, by a user's computer, at least one share on the computer, and a path to one of the at least one share, wherein each said share on the computer is identified until the total number of said identified shares on the computer equals a share threshold and, after the share threshold is reached, the step of identifying the shares is terminated; and (d) creating at least one shortcut to each said identified share.

10. The method of claim 9 wherein the share threshold is 10.

11. A first computer connected to a computer network, the first computer having a computer-readable medium with computer-executable instructions stored thereon for performing steps comprising:

(a) identifying each domain on the network;

(b) identifying each networked computer in each said domain;

(c) identifying, by said first computer, each printer connected to each networked computer, and a first path to a printer; and (d) identifying, by said first computer, each share on each said networked computer, and a second path to a share, wherein the computer-readable medium has computer-executable instructions for creating shortcuts on the first computer to each said printer and each said share, and wherein the computer-readable medium has a resource threshold stored thereon, whereby the steps of identifying each said printer and each said share are terminated if the sum total number of said identified printers and said identified shares equal said resource threshold.

* * * * *